No. 710,700. Patented Oct. 7, 1902.
J. LUND.
BORING IMPLEMENT.
(Application filed Feb. 10, 1902.)
(No Model.)
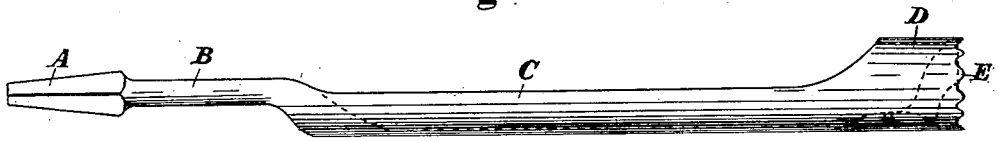
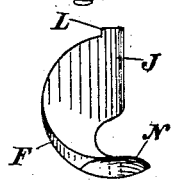
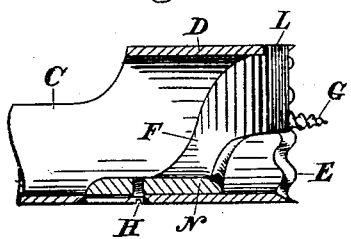
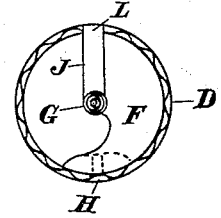
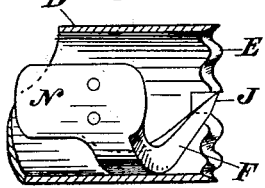
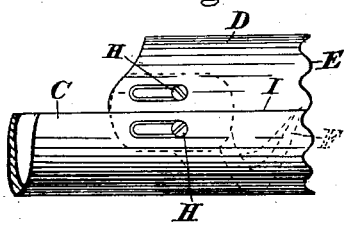
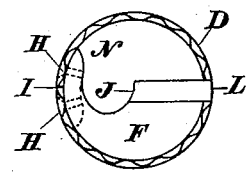

UNITED STATES PATENT OFFICE.

JOEL LUND, OF SAN FRANCISCO, CALIFORNIA, ASSIGNOR OF ONE-HALF TO FREDERICK C. H. MILLER, OF SAN FRANCISCO, CALIFORNIA.

BORING IMPLEMENT.

SPECIFICATION forming part of Letters Patent No. 710,700, dated October 7, 1902.

Application filed February 10, 1902. Serial No. 93,313. (No model.)

*To all whom it may concern:*

Be it known that I, JOEL LUND, a citizen of the United States, residing at San Francisco, county of San Francisco, and State of California, have invented certain new and useful Improvements in Boring Implements; and I hereby declare the following to be a full, clear, and exact description of the same, reference being had to the accompanying drawings, forming a part of this specification.

My invention relates to boring implements for wood and to certain improvements therein.

My improvement consists in a boring implement for wood provided with an integrally-formed tubular guiding-shell above to guide the cutting edges, the tubular portion of the implement being a part of and integral with the main shank or stem forming the annular or spur-cutting edges and directing the course of the implement so straight true holes can be made, and also consists in other features hereinafter explained and illustrated by drawings that form a part of this specification.

The object of my invention is to provide an inexpensive wood-boring implement with interchangeable cutters that with or without a feed-screw will bore holes in thin, round, or brittle material without splitting the same, constructed to facilitate sharpening the spurs and cutting edges, that by its own action will cause it to assume a position normal to the surface of the wood when that is required, and after penetrating the same will follow a true line and not deviate from its course.

To these ends I construct boring implements as shown in the drawings, Figure I being a side view of the implement; Fig. II, an enlarged view in section of the cutting end; Fig. III, an enlarged side view of the same end at a right angle to Fig. II; Fig. IV, a similar view with the shell or tube in section; Fig. V, an end view of Fig. III; Fig. VI, an end view of Fig. II, and Fig. VII an end view of the bit or cutter in Fig. II.

The main member of the implement, consisting of a driving extension A, shank B, and semicircular barrel C, is at its end provided with tubular part D, that corresponds to the diameter of the hole to be bored. The end of the tubular part D is serrated or scalloped, as shown in the several figures of the drawings, to form cutting-spurs E, that are equally disposed around the periphery, and consequently cause the implement to assume when starting a position normal to the surface of the wood when that is required.

Inside the tubular portion D is fastened a suitable cutter or bit F for severing the wood transverse to the axis of revolution. This cutter when required is provided with the usual tapering screw G; but this is not essential when some pressure can be applied by the operator to force the implement forward, hence is omitted in the drawings, except in Figs. II and VI. The cutter F is adjustably held by screws H, preferably two in number, to hold the tubular portion D in case the latter is slit, as at I in Figs. III and V, to facilitate manufacture, as will be hereinafter explained. This cutter F has a radial edge J, that cleaves the wood spirally, displacing and raising the chips through the tubular part D after the perimeter is severed by the spur-cutters E in the usual manner of auger-bits and is provided with an extension L, that passes through a notch M in the part D to the outside or periphery of the part D or of the hole bored, as shown in Figs. II, V, and VI. This extension not only serves to completely cover the whole area cut away, but also provides a means of driving the cutter which would otherwise fall wholly on the screws H. The shank N of the cutter F is curved to fit the interior of the tubular part D and is made thin to avoid obstruction. The part C being a thin curved shell, as indicated in Fig. III, leaves ample room for the chips to rise or work out after they have passed beyond the part D, and in this manner it will be seen that the implement will operate free and bore a true accurate hole without deviation.

The part D can be a complete tube or can be forged with the part G and prepared as a flat plate and then bent into a cylindrical and curved form, leaving a slit I, as in Figs. III and V, and held by the screws H H, or this seam can be soldered or brazed, if preferred.

Having thus explained the motive and objects of my invention, what I claim as new, and desire to secure by Letters Patent, is—

1. In a wood-boring implement, a semicircular shell made integral with and terminating in a tubular part that fills the hole bored, the anterior end of the tubular part formed into spurs or cutters, and an adjustable bit or cutter to detach and raise the chips, in the manner substantially as described.

2. In a wood-boring implement, a solid driving-shank, a semicircular hollow stem, and an anterior tubular end integrally formed, the latter serrated or scalloped to form cutting-spurs, and an adjustable bit or cutter having a radial edge that extends to the periphery of the tubular cutting end or of the hole bored, substantially as specified.

3. In a wood-boring implement, an anterior tubular extension that fills the holes to be bored, provided with spurs or cutters acting in the line of the implement's advance, and notched to receive and drive an adjustable interior cutter that severs the wood transversely to the implement's advance, substantially as and for the purposes specified.

In testimony whereof I have signed my name to this specification in the presence of two subscribing witnesses.

JOEL LUND.

Witnesses:
ALFRED A. ENQUIST,
P. W. J. LANDER.